Feb. 24, 1942.   W. J. CHELLEW   2,273,817
WINDSHIELD CLEANER
Filed July 21, 1939
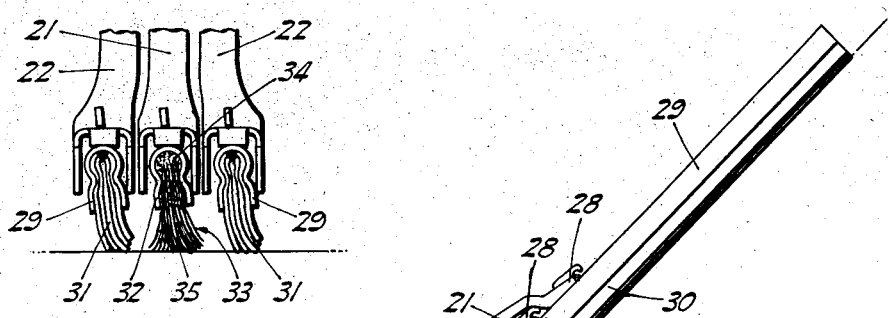
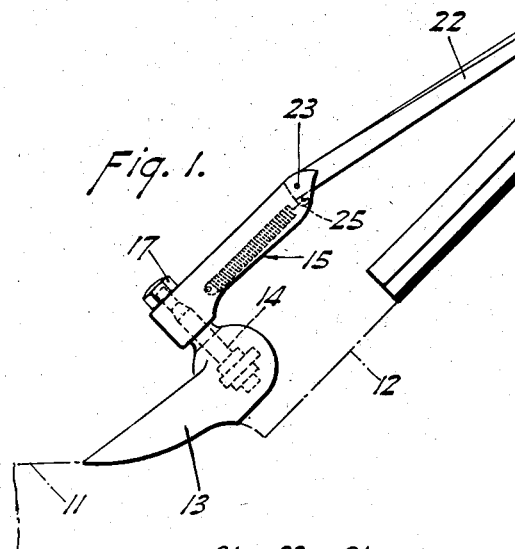
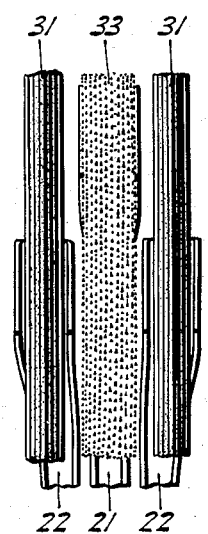
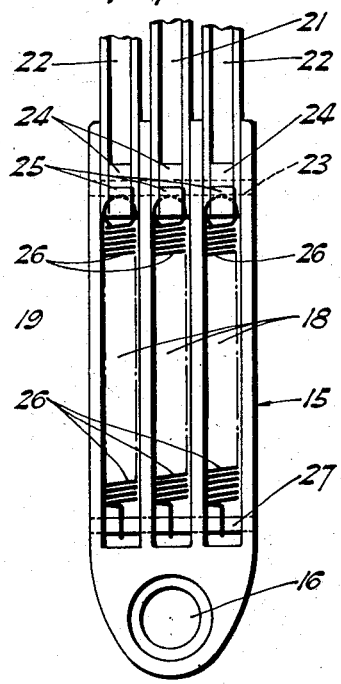
INVENTOR
Walter J. Chellew
BY
Beau, Brooks, Buckley & Beau
ATTORNEYS Patented Feb. 24, 1942

2,273,817

UNITED STATES PATENT OFFICE 2,273,817

WINDSHIELD CLEANER

Walter J. Chellew, Buffalo, N. Y., assignor to Trico Products Corporation, Buffalo, N. Y.

Application July 21, 1939, Serial No. 285,750

3 Claims. (Cl. 15—255)

The present invention relates to windshield cleaners and has particular reference to an improved arrangement of wiper elements and supporting means therefor.

According to the invention a plurality of wiping elements, one of which is a brush and another of which is a resilient blade, are arranged side by side for movement over a glass surface to be cleaned, the bristles of the brush serving to loosen material on the glass which may be hardened or frozen thereon and the blade cooperating with it, in its cleaning action, by carrying away the loosened material.

The wiping elements are provided with spring means for resiliently pressing them into wiping contact with the windshield or other glass surface upon which they operate, and according to the invention the spring means act independently upon each wiping element, whereby each may have sufficient wiping pressure regardless of the degree of wear or the adjustment of the several parts.

In achieving this objective a plurality of wiper arms, one for each wiper element, may be connected to a wiper head in substantially parallel relation, and springs may be provided, each one of which is effective between the head and one of the wiper arms.

These and other objects and advantages will become apparent from the following description of the embodiment of the invention shown in the accompanying drawing, wherein:

Fig. 1 is a side elevational view of a windshield cleaner including the improved wiper head, wiper arm and wiper elements;

Fig. 2 is a rear elevational view of the wiper head and wiper arm assembly, parts of the arms being broken away;

Fig. 3 is a fragmentary bottom view of the wiper elements and the arms; and

Fig. 4 is a fragmentary outer end view of the wiper elements and wiper arms.

As shown in Fig. 1 the windshield cleaner may be mounted on a vehicle 11 adjacent the windshield 12 thereof, and may include a support 13 and a shaft 14 which may be oscillated angularly about its axis by suitable mechanism (not shown). Connected to the shaft for movement therewith is a wiper head 15, the latter having an opening 16 receiving the shaft, and a cap nut 17 being screw threaded onto the end of the shaft to retain the head thereon.

The wiper head has a plurality of recesses 18 formed on the rear face thereof, and disposed in the outer ends of these recesses, between the side walls 19 thereof, are a plurality of substantially parallel wiper arms. In the illustrated embodiment three such arms, including a central arm 21 and side arms 22, are pivoted to the head by a pivot pin 23. Each arm is of generally channel cross-section, the channels thereof adjacent the pin 23 being filled by blocks 24, each block having a hook 25 provided thereon.

Tensioned springs 26 disposed in the recesses 18 each have one end connected to the hook 25 of one wiper arm, and each has the other end thereof connected to an anchor pin 27 which extends through walls 19.

Wiper elements are detachably connected to the outer ends of arms 21, 22, preferably by a hook and slot connection 28 such as is described in United States Patent No. 1,946,073 granted to Erwin C. Horton et al. for Wiper blade and mounting. The wiper elements connected to the side arms 22 consist of a holder 29, of generally channel shape in cross-section, supporting one or more strips or blades of rubber 31 for wiping contact with the windshield glass.

The wiper element connected to the central arm 21 consists of a holder 32 of form similar to holders 29, and a brush 33 supported thereby. The brush may consist of a plurality of bristles 35 embedded in or otherwise secured to a suitable backing 34 which is secured within the channel of holder 32.

In operation of the apparatus, as the shaft 14 is oscillated the arm and wiping element assembly carried thereby will be moved back and forth across the windshield in a generally arcuate path. The brush 33 whose bristles are preferably relatively stiff serves to scrub the windshield, loosening solid or frozen matter which may adhere to the windshield too firmly to be displaced by the conventional rubber wiper. The resilient blades 31, one of which trails the brush on each wiping stroke, serve to carry away material loosened by the brush, and otherwise serve to remove moisture in the usual manner.

By the independent mounting of the several wiping elements each may have a flopping action about its connection 28 as the wiping stroke is reversed; each may be removed or replaced independently of the others; and each is maintained, by the spring 26 associated with its arm, in proper wiping contact with the glass 12 regardless of the degree of wear or adjustment of the other wiping elements. In order to aid in manipulation of the parts should it be necessary to lift one of them from the windshield glass, the central arm 21 is preferably slightly longer than arms 22, and its connection 28 therefore is offset from the connections of the other arms, 22, to their wiper elements.

It will be understood that the embodiment of the invention herein shown and described is merely illustrative of the inventive principles involved, and that the latter may be otherwise embodied without departing from the spirit of the invention or the scope of the appended claims.

I claim:

1. In a windshield cleaner, a plurality of wiper elements in closely spaced substantially parallel relation adapting them to wipe over substantially the same surface portion of a windshield, a wiper head, a wiper arm for each wiper element supported by said head to carry the wiper element independently of another of said wiper elements in engagement with the surface of the windshield, each wiper arm having a detachable connection with the wiper element carried thereby, and one of said detachable connections being offset lengthwise of the wiper elements from the detachable connection of another of said wiper arms.

2. In a windshield cleaner, a wiper head, a plurality of wiper arms each having an articulated connection to said head, each of said arms having means to pivotally connect thereto a wiper-element, said arms being connected to said head in such manner that they are adapted to support said wiper elements in closely spaced substantially parallel relation to wipe over substantially the same surface portion of a windshield, and a spring associated with each arm for urging it relative to the head toward the windshield independently of the other of said arms.

3. In a windshield cleaner, a wiper head, a plurality of wiper arms in closely spaced substantially parallel relation, and a pivot pin extending through said head and each of said arms for pivotally connecting the latter for movement independently of each other to said head, and a spring connected to each arm and to said head for urging movement of the arm toward the same surface of the windshield about the axis of said pivot pin, each arm having means for pivoted connection to a wiper element, said connection means of the plurality of arms being so related that the elements carried thereby will be in closely spaced, substantially parallel relation for wiping substantially the same surface portion of the windshield.

WALTER J. CHELLEW.